UNITED STATES PATENT OFFICE.

WILLIAM MORRISON, OF CHICAGO, ILLINOIS, ASSIGNOR TO KING UPTON, OF CHICAGO, ILLINOIS.

SECONDARY BATTERY.

SPECIFICATION forming part of Letters Patent No. 717,107, dated December 30, 1902.

Application filed May 19, 1900. Serial No. 17,206. (No model.)

*To all whom it may concern:*

Be it known that I, WILLIAM MORRISON, a citizen of the United States of America, and a resident of Chicago, Cook county, Illinois, have invented a certain new and useful Improvement in Secondary Batteries, of which the following is a specification.

In a common form of secondary battery the active surface of the negative plate is a coating of minium or red lead in the form of a paste, which in the charge becomes a peroxid of lead. In a positive plate the active surface is a coating of litharge or yellow oxid of lead, which in the charge becomes a porous spongy lead mass. To form the red lead into a paste, it is usually mixed with dilute sulfuric acid or sulfuric acidulated water. This produces a small quantity of sulfate of lead in a solution, and in drying the sulfate slowly sets into the mass as it hardens. With this construction, however, when the charging is pressed too far the lead sulfate is changed to a peroxid or binoxid of lead, the sulfuric acid is expelled, and the bond is relaxed until the peroxid coating powders and crumbles away.

The object of the present invention is to overcome this difficulty, and this I have discovered may be accomplished by using hydrofluoric acid in the battery by mixing it with the lead paste forming the active material or material to become active. Hydrofluoric acid being strongly electropositive, it will unite with the sulfuric acid of the electrolyte to form a fluorid of lead which resists the destructive effects of overcharging hereinabove referred to and perpetuates the bond of the paste, so as to prevent the latter from crumbling.

The advantage of the improvement in increasing the longevity of secondary batteries will thus be apparent.

I claim as my invention—

1. In a storage battery, the combination of a suitable electrolyte, and positive and negative elements immersed in said electrolyte, one of said elements having a paste containing fluorin.

2. In a storage battery the combination of a suitable electrolyte, and negative and positive elements immersed in said electrolyte, one of said elements having a paste formed by mixing lead oxid with hydrofluoric acid.

3. A paste for storage batteries formed by combining suitable ingredients with hydrofluoric acid.

Signed by me at Chicago, Cook county, Illinois, this 17th day of May, 1900.

WILLIAM MORRISON.

Witnesses:
CHAS. C. BULKLEY,
G. H. BAUMGARTNER.